(12) United States Patent
Pottie

(10) Patent No.: US 8,636,225 B2
(45) Date of Patent: Jan. 28, 2014

(54) FLUID-REGULATING THERMOSTAT AND METHOD OF MANUFACTURING SUCH A THERMOSTAT

(75) Inventor: Nicolas Pottie, Sainie Genevieve des Bois (FR)

(73) Assignee: Vernet, Ollainville (FR)

( * ) Notice: Subject to any disclaimer, the term of this patent is extended or adjusted under 35 U.S.C. 154(b) by 926 days.

(21) Appl. No.: 12/087,774

(22) PCT Filed: Jan. 16, 2007

(86) PCT No.: PCT/FR2007/000074
§ 371 (c)(1),
(2), (4) Date: May 26, 2010

(87) PCT Pub. No.: WO2007/083013
PCT Pub. Date: Jul. 26, 2007

(65) Prior Publication Data
US 2010/0251979 A1    Oct. 7, 2010

(30) Foreign Application Priority Data
Jan. 17, 2006   (FR) ..................................... 06 00402

(51) Int. Cl.
*F01P 7/16*   (2006.01)
*F01L 3/10*   (2006.01)

(52) U.S. Cl.
USPC ........................................... 236/34; 251/337

(58) Field of Classification Search
USPC ..................... 236/34, 34.5; 251/337
See application file for complete search history.

(56) References Cited

U.S. PATENT DOCUMENTS

| | | | | |
|---|---|---|---|---|
| 1,644,325 A | * | 10/1927 | Carson, Jr. | 236/34 |
| 1,658,403 A | * | 2/1928 | Boyer | 251/337 |
| 1,784,058 A | * | 12/1930 | Giesler | 60/516 |
| 1,784,061 A | * | 12/1930 | Giesler | 236/34 |
| 2,721,706 A | * | 10/1955 | Schoerner | 237/8 R |
| 3,156,259 A | * | 11/1964 | Havelka et al. | 137/516.23 |
| 3,167,249 A | | 1/1965 | Moosmayer et al. | |
| 3,228,419 A | * | 1/1966 | Smith et al. | 137/540 |
| 3,292,856 A | * | 12/1966 | Beatenbough et al. | 236/34 |

(Continued)

FOREIGN PATENT DOCUMENTS

GB   2 108 663 A   8/1983

*Primary Examiner* — Ljiljana Ciric
*Assistant Examiner* — Alexis Cox
(74) *Attorney, Agent, or Firm* — Dowell & Dowell, PC

(57) ABSTRACT

This thermostat (1) comprises a body (10) which comprises a one-piece metal part (11) including simultaneously, in succession along the axis (X-X) of a thermostatic element (20) of the thermostat, a transverse tab (12) against which the piston (22) of this element can bear, a tubular part (13) centred on this axis and defining a shut-off seat (13A), and two support arms (14) supporting a return spring (40) for returning this element, which arms extend lengthwise more or less in the axial direction of the element and each delimits, at their opposite end (14A) to the tubular part, a surface (14A1) for contact with the spring against which surface the compressed spring is pressed. To make it easier to manufacture this body and to assemble it with the other components of the thermostat, each arm is, at its end (14B) facing towards the tubular part, connected to the rest of the one-piece metal part in a way that can be deformed between a service position in which the contact surface is plumb with one end of the spring, and an assembly position in which this surface is away from the axis.

16 Claims, 4 Drawing Sheets

(56) References Cited

U.S. PATENT DOCUMENTS

| | | | |
|---|---|---|---|
| 3,351,279 A | 11/1967 | Saur | |
| 3,558,046 A * | 1/1971 | Kelly | 236/34 |
| 3,792,813 A * | 2/1974 | Saur et al. | 236/100 |
| 4,011,988 A * | 3/1977 | Inagaki | 236/34.5 |
| 4,032,067 A * | 6/1977 | Hanaoka et al. | 236/34.5 |
| 4,091,991 A * | 5/1978 | Sliger | 236/34.5 |
| 4,164,322 A * | 8/1979 | Wong et al. | 236/34.5 |
| 4,193,542 A * | 3/1980 | Knauss | 236/34.5 |
| 4,248,374 A * | 2/1981 | Sliger | 236/34.5 |
| 4,428,527 A * | 1/1984 | Daigler | 236/34.5 |
| 4,524,907 A * | 6/1985 | Wong | 236/34.5 |
| 4,543,988 A * | 10/1985 | Huveteau | 137/542 |
| 4,679,530 A * | 7/1987 | Kuze | 123/41.1 |
| 5,170,752 A * | 12/1992 | Binversie et al. | 123/41.08 |
| 5,503,329 A * | 4/1996 | Saladino | 236/34.5 |
| 6,942,221 B2 * | 9/2005 | Keeley et al. | 277/608 |
| 6,966,278 B2 * | 11/2005 | Takahashi | 123/41.1 |
| 8,141,790 B2 * | 3/2012 | Sheppard | 236/34.5 |
| 2003/0183701 A1 * | 10/2003 | Takahashi | 236/34.5 |

* cited by examiner

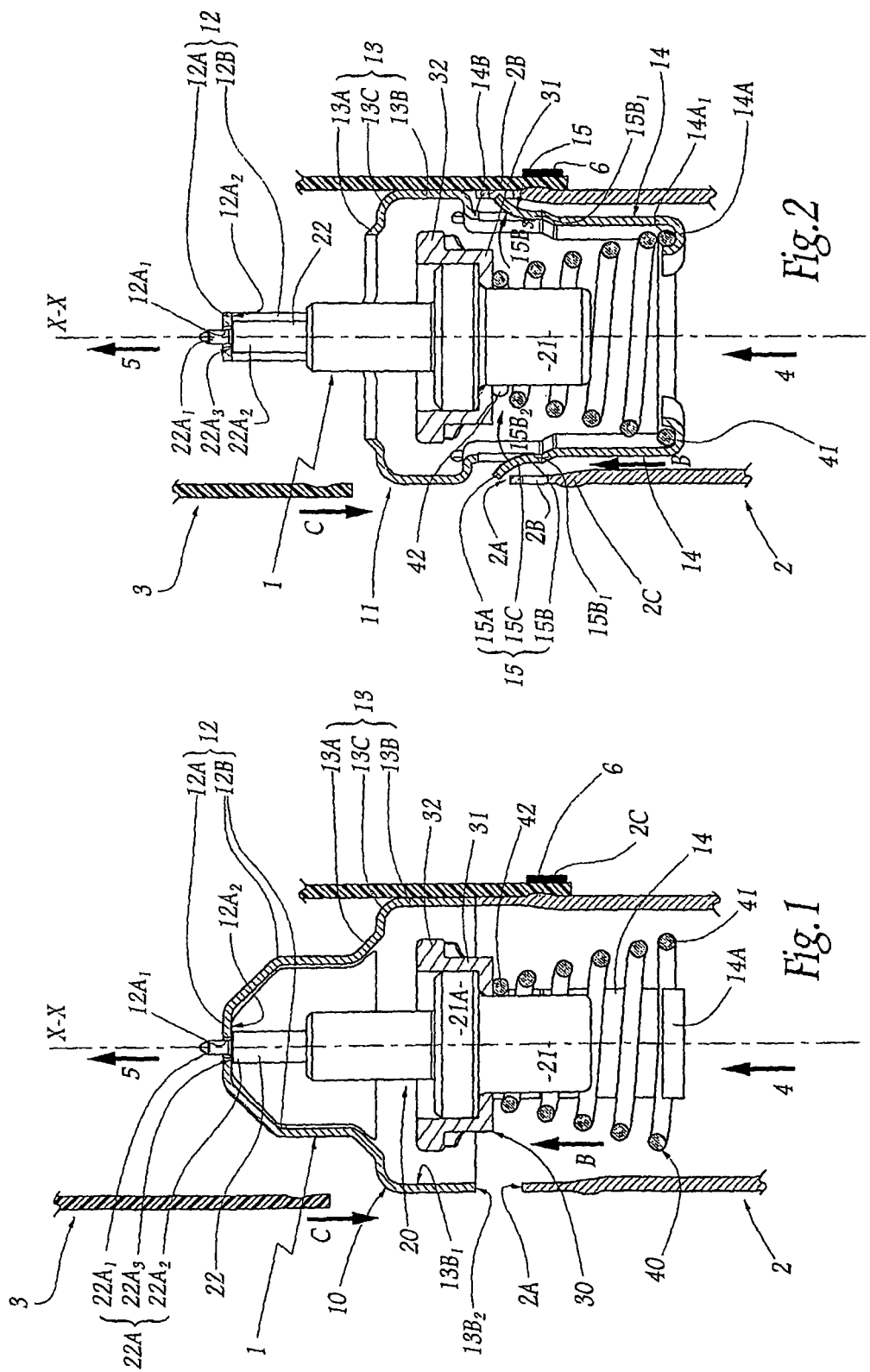

FLUID-REGULATING THERMOSTAT AND METHOD OF MANUFACTURING SUCH A THERMOSTAT

BACKGROUND OF THE INVENTION

1. Field of the Invention

The present invention relates to a fluid regulator thermostat, in particular for a cooling fluid of an internal combustion engine, and also to a method of fabricating such a thermostat.

The invention relates more particularly to thermostats that combine firstly a thermostatic element that is responsive to the temperature of the fluid to be regulated, controlling the shutting of a flow of fluid through the thermostat and associated with a return spring, and secondly a body within which there are arranged both said thermostatic element and the spring. The body of the thermostat must satisfy conflicting constraints: firstly the structure must be sufficiently rigid to absorb the pressure of the fluid being regulated and the mechanical forces associated with operation of the thermostatic element and its return spring, and secondly the structure must be sufficiently open to define one or more paths for allowing the fluid to pass through the thermostat, and at satisfactory flow rates.

2. Brief Description of the Related Art

Traditionally, the body of this type of thermostat is molded out of a plastics material for numerous reasons, in particular ease and cost of fabrication. Nevertheless, the use of a plastics material involves significant design constraints associated with the only moderate mechanical strength of the plastics material, in particular in terms of resistance to creep: within a cooling circuit for an internal combustion engine, the body of the thermostat is subjected to vibration, and at certain engine speeds, the temperature of the cooling fluid can reach values that are high. Taking these mechanical and thermal constraints into account requires the thermostat body, when made of plastics material, to be dimensioned with walls of significant thickness, thereby limiting the maximum flow rate possible through the thermostat.

To avoid that drawback in part, proposals have been made in the past to reinforce the structure of the plastics material body with one or more metal pieces fitted thereto. In particular, a metal washer is sometimes provided in the zone of the thermostat body that absorbs the reaction from the return spring of the thermostatic element. Nevertheless, recourse to fitting such metal pieces not only complicates the design of the thermostat body, thereby limiting options for installing the thermostat at various points within a cooling circuit and/or within different circuits, but also complicates the fabrication of the thermostat since it requires a large number of parts to be assembled.

In the past, proposals have also been made to integrate the thermostat within a body made of two distinct parts of plastics material that are of generally tubular shape, and that are for fitting to each other with an interposed sealing gasket. That body forms a kind of housing that presents a major risk of leaking, and it generally incorporates an internal reinforcing metal bracket for absorbing the forces associated with the work of the thermostatic element, thereby likewise complicating the design of the thermostat and its fabrication.

U.S. Pat. Nos. 3,351,279 and 3,792,813 propose using a thermostat body that is made entirely out of metal, thereby ensuring good mechanical strength. Nevertheless, such metal bodies raise fabrication problems and problems of assembly with the other components of the thermostat, in particular the thermostatic element and its return spring.

Thus, U.S. Pat. No. 3,351,279 proposes a thermostat body in which one of the spring support arms is not formed integrally with the remainder of the body, but is fitted to the body either by means of a hinge or by wedging. Fabrication of the body is thus complex, and in operation the connection zone between the fitted arm and the remainder of the body presents a risk of breaking or of malfunctioning.

U.S. Pat. No. 3,792,813 also envisages various metal embodiments for thermostat bodies, each made up of two distinct portions that are fitted together. In its FIG. 7, that document discloses a one-piece embodiment, in which two arms for supporting a spring of a thermostatic element are made integrally out of the same material as the remainder of the thermostat body, which body can be made by stamping. Nevertheless, although U.S. Pat. No. 3,792,813 explains how the thermostat is to be assembled when the body is made of two parts, specifically by taking advantage of its two-part structure for assembling the thermostatic element and its spring in one of the parts of the body prior to fastening the other part thereto, that document is silent as to how to assemble the one-piece body with the other components of the thermostat. Thus, the one-piece solution proposed in U.S. Pat. No. 3,792,813 cannot be made in practice, it being observed in addition that the arms of the thermostat body are inclined at 45° relative to the working axis of the thermostatic element and of its spring, such that, in operation, those arms run the risk of splaying apart from each other under the action of the forces generated by the thermostatic element and the spring, thereby leading to malfunction of the thermostat.

SUMMARY OF THE INVENTION

The object of the present invention is to propose a thermostat, in particular for a cooling circuit of an internal combustion engine, in which the body presents a structure that is effective in absorbing the forces associated with the work of the thermostatic element incorporated in the thermostat, and that allows a substantial flow rate for the regulated fluid, while being easy to fabricate and assemble with the other components of the thermostat.

To this end, the invention provides a fluid regulator thermostat, in particular for regulating a cooling fluid of an internal combustion engine, as defined in claim 1.

The fact of making the thermostat body of the invention as a one-piece metal fitting presents firstly structural advantages that are inherent to the metal nature of the fitting: ability to withstand high temperatures is improved, in particular in comparison with a body made of plastics material, and the wall thickness of the body can be moderate while nevertheless achieving satisfactory mechanical strength, this thickness being in particular less than the thickness of walls made of plastics material and presenting a similar level of strength. The structure thus makes large fluid flow sections possible through the thermostat, and consequently allows high regulated flow rates. In addition, the one-piece metal body is easily obtained by working a metal sheet in appropriate manner, in particular by stamping.

In addition, the mechanical strength of the body, in particular relative to the thermostatic element and its return spring, both during assembly and during operation of the thermostat, makes it possible to avoid fitting stiffener pieces to the body, thereby facilitating design of the body and also making it easy to implant at various different points in a cooling circuit. The outside shape of the body can also be adapted at will, e.g. so that the body can be put into place at the end of a stainless steel tube prior to being covered by a hose, without it being necessary to interpose a sealing gasket, or for example so that the outside shape of the body is close to that of a pre-existing thermostat tube.

According to the invention, the deformable connection between the support arms and the remainder of the one-piece metal fitting of the thermostat body is provided to make it easier to fabricate the thermostat, enabling assembly to be performed quickly and easily with the other components of the thermostat.

Other characteristics of this thermostat that are advantageous, taken in isolation or in any technically feasible combination, are set out in claims 2 to 12.

The invention also provides a method of fabricating a fluid regulator thermostat as defined above, which method is defined in claim 13, and presents advantageous characteristics as defined in claim 14.

BRIEF DESCRIPTION OF THE DRAWINGS

The invention can be better understood on reading the following description given purely by way of example and made with reference to the drawings, in which:

FIGS. 1 and 2 are longitudinal sections of a thermostat of the invention on respective section planes are mutually perpendicular, the left-hand halves of these figures showing the thermostat while it is being put into place within a fluid flow path, while the right-hand halves show the thermostat once it has been put fully into place;

DETAILED DESCRIPTION OF THE PREFERRED EMBODIMENTS

Figure 3:
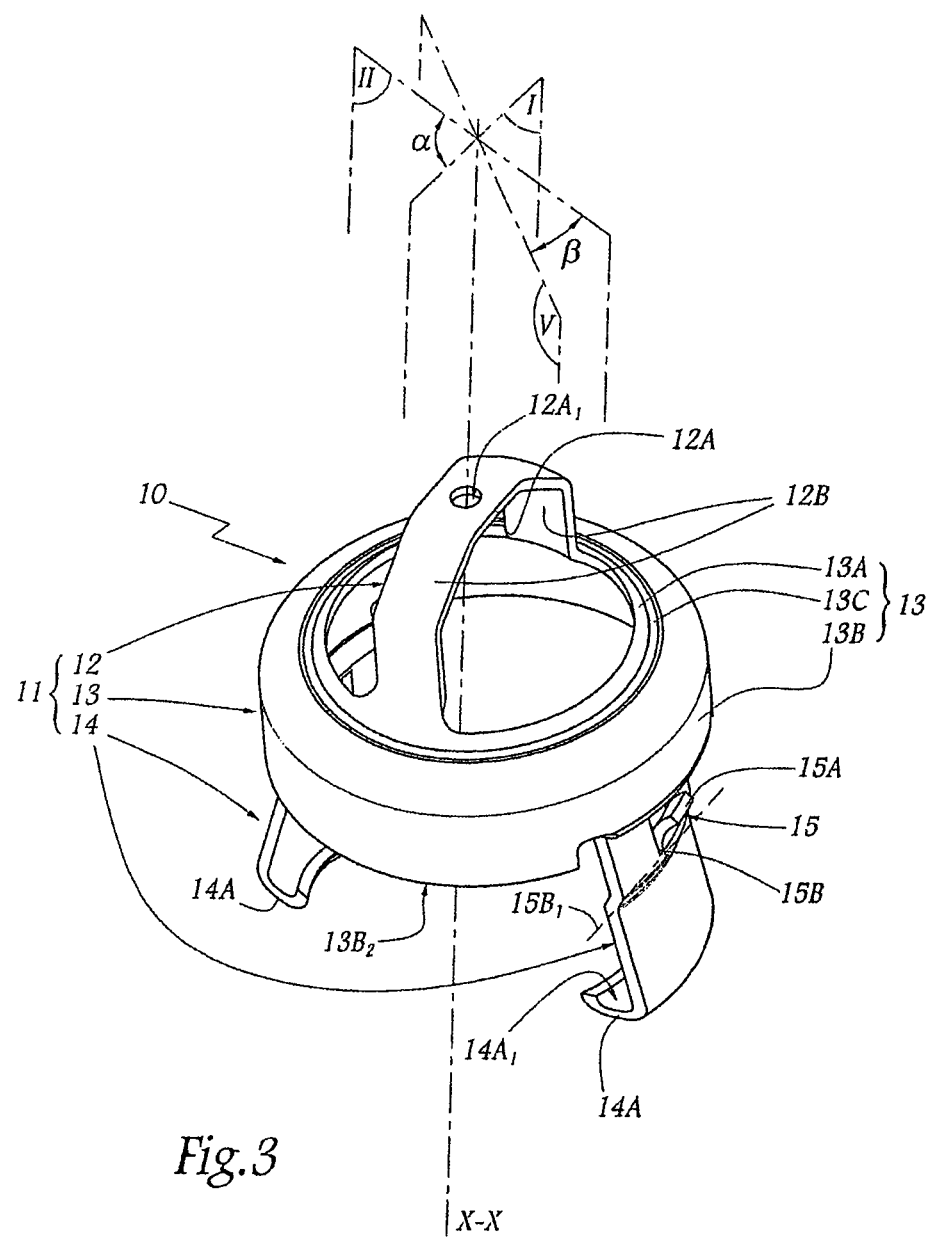
FIG. 3 is a perspective view of the body of the thermostat of FIGS. 1 and 2, shown on its own, prior to being assembled with the other components of the thermostat, the section planes of FIGS. 1 and 2 being referenced I and II respectively in FIG. 3.

FIGS. 1 and 2 show a thermostat 1 for regulating the flow of a cooling fluid, e.g. flowing in a cooling circuit of an internal combustion engine. In operation, the thermostat is designed to be put into place at a connection zone between an outlet tube 2 from a heat exchanger forming part of the cooling circuit and a hose 3 for conveying the liquid to a downstream point of the circuit. By way of example, the tube 2 is made of metal, constituting the outlet from a heat exchanger associated with a system for exhaust gas recirculation (EGR). The EGR system is an antipollution device that injects some of the exhaust gas into the admission tube of the engine in order to reduce combustion temperature peaks and thus reduce the formation of pollutants such as nitrogen oxides. As represented by arrow 4, the cooling fluid leaving the heat exchanger of the EGR system is admitted to the inlet of the thermostat 1 that, as a function of the temperature of said fluid, controls whether the hose 3 is fed with the fluid, as represented by arrow 5. How the thermostat 1 is put into place in the junction zone between the tube 2 and the hose 3 is described below.

For convenience, the description below is given relative to the flow direction of the fluid through the thermostat 1 as shown in FIGS. 1 and 2, with terms such as "up" and "top" designating a direction in the flow directions 4 and 5, i.e. directed towards the top portions of FIGS. 1 to 6, whereas terms such as "down" and "bottom" designate the opposite direction. Thus, the cooling fluid sweeps vertically upwards through the thermostat 1 while it is open.

The thermostat 1 extends lengthwise in a vertical direction in FIGS. 1 and 2 about a central axis X-X. It comprises four distinct components that are assembled together in a manner that is described below, specifically an outer body 10, a thermostatic element 20, a shutter member 30, and a spring 40.

The body 10, shown on its own in FIG. 3, is in the form of a one-piece metal fitting 11 extending along and around the axis X-X, and within which the other components 20, 30, and 40 are arranged.

The thermostatic element 20 comprises a bottom cup 21 centered on the axis X-X and containing a thermally expandable material such as wax. The cup is continuously immersed in the fluid feeding the thermostat 1 such that the element 20 is subjected to the temperature of the fluid. The element 20 also comprises a top piston 22 centered on the axis X-X and movable relative to the cup 21 in translation along the axis X-X. This piston is movable under the effect of the thermally expandable material contained in the cup 21 expanding, the piston being deployed out from the cup when said material is heated. The piston 22 has a top end portion 22A that is stepped along the axis X-X: at its free end, this portion 22A includes a top end peg $22A_1$ integrally molded with the rod $22A_2$ constituting the remainder of the portion 22A and presenting a diameter smaller than that of the rod. A radial shoulder $22A_3$ is thus defined between the peg $22A_1$ and the rod $22A_2$.

In operation, the piston 22 is designed to be axially stationary relative to the body 10. For this purpose, the end portion 22A of the piston bears axially against a wall 12A of the fitting 11, which wall is centered on the axis X-X and generally occupies a plane that is substantially perpendicular to said axis. The wall 12A is pierced by a through cylindrical orifice $12A_1$ on the axis X-X that presents a cross-section that substantially matches the cross-section of the top end peg $22A_1$ of the piston 22.

The shutter member 30 comprises an annular main body 31 centered on the axis X-X and permanently secured to the cup 21, e.g. being engaged as a force-fit around a swollen portion 21A of the cup. At its top end, the body 31 is provided with a peripheral rim 32 projecting radially outwards from the body 31. This rim forms a member for closing off fluid flow through the thermostat 1. For this purpose, the rim 32 is adapted to bear in leaktight manner against an associated seat constituted by a wall 13A of the fitting 11, said wall being of frustoconical shape centered on the axis X-X. In operation, since the piston 22 of the element 20 is prevented from moving relative to the body 10, an increase in the temperature of the fluid feeding the thermostat causes the cup 21 to move downwards in translation along the axis X-X, thereby moving the shutter member that is associated therewith, so that the rim 32 then moves away from the wall of the seat 13A so as to allow the fluid to pass through the thermostat, towards the hose 3.

Figure 4:
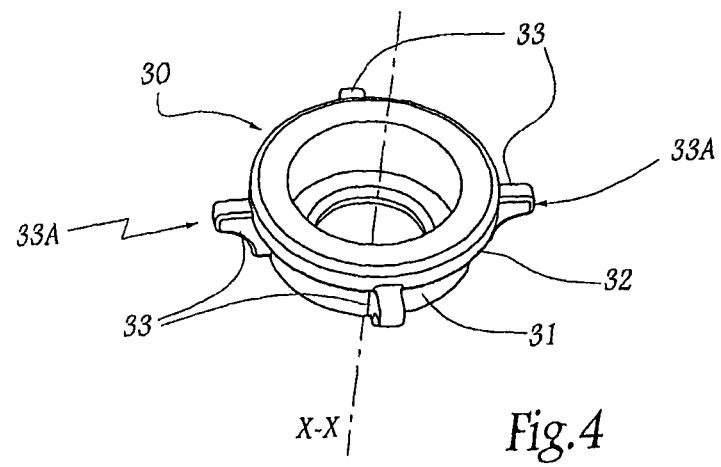
FIG. 4 is a perspective view of the shutter member of the thermostat of the invention, shown on its own.
Figure 5:
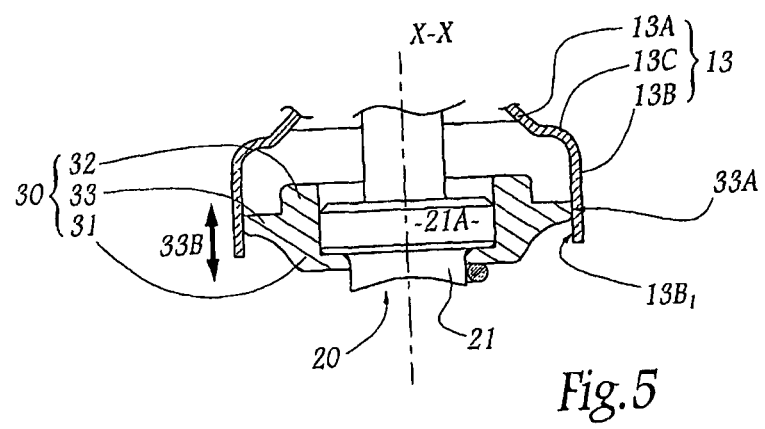
FIG. 5 is a fragmentary longitudinal section view of the thermostat of FIGS. 1 and 2, on a section plane different from that of FIGS. 1 and 2, corresponding to the plane referenced V in FIG. 3.

In order to guide the movement in translation of the cup 21 and of the shutter member 30 within the thermostat 1, the shutter member is advantageously provided with four fingers 33 distributed uniformly around the outer periphery of the body 31. As shown in FIGS. 4 and 5, each finger 33 extends radially outwards from the outside face of the body 31, beneath the rim 32, and beyond the rim 32. Each finger 33 is thus dimensioned in such a manner that the radial distance between the axis X-X and the outer end face 33A of the finger is substantially equal to the radius of the inside face $13B_1$ of the wall 13B of the fitting 11, which is cylindrical in shape on a circular base about the axis X-X. As a result, when the cup 21 is driven in translation and entrains the shutter member 30 in corresponding manner, the end faces 33A of the fingers 33 slide against the inside face $13B_1$ of the wall 13B, as represented by arrow 33B in FIG. 5. Since the fingers 33 are regularly distributed around the outer periphery of the body 31, they are effective in guiding the movement in translation of the shutter member relative to the cylindrical wall 13B, centering it on the axis of said wall, i.e. on the axis X-X.

It can be understood that the inside diameter of the cylindrical wall 13B is greater than the maximum outside diameter of the frustoconical wall 13A. In practice, the wall 13A and the wall 13B situated axially immediately beneath the wall 13A are made integrally out of the same material, being connected together via a radial shoulder 13C of the fitting 11. As a result, the walls 13A and 13B together with the shoulder 13C form a portion 13 of the fitting 11 that is tubular in shape with a solid peripheral wall, as can be seen clearly in FIG. 3.

As shown in FIGS. 1 to 3, the tubular portion 13 has its top end connected to the wall 12A by two branches 12B that are diametrically opposite about the axis X-X. Each branch 12B extends from a small region of the top periphery of the wall 13A to the wall 12A in a general direction that slopes relative to the axis X-X. The wall 12A and the two branches 12B thus form a tab 12 extending transversely relative to the axis X-X and crossing said axis, with the fluid being free to flow on either side thereof towards the hose 3.

At its bottom end, the tubular portion 13 is formed integrally with two arms 14 of the fitting 11, which arms extend generally lengthwise parallel to the axis X-X, being diametrically opposite each other about said axis, as can be seen in FIGS. 2 and 3.

The bottom end 14A of each arm 14 is in the form of a hook with its recess facing upwards. The recess is suitable for receiving the bottom end turn 41 of the spring 40, the hook shape ensuring that the turn 41 is held in position transversely. In the assembled state of the thermostat 1, the spring 40 is interposed between the ends 14A of the arms 14 and the shutter member 30, with the top end turn 42 of the spring surrounding the cup 21. The spring 40 is designed to urge the cup 21 towards the piston 22 when the thermally expandable material contained in the cup contracts, in particular during a drop in the temperature of the fluid in which the cup is immersed. In practice, the spring 40 is assembled in the compressed state between the shutter member 30 and the arms 14 so as to develop sufficient return force while the thermostat 1 is in operation. Under such conditions, it will be understood that the turn 41 presses downwards against the surface $14A_1$ at the bottom of the recess in the hook-shaped end 14A of each arm.

At its top end 14B, each arm 14 is made integrally with a small region of the bottom periphery of the cylindrical wall 13B.

Thus, the one-piece metal fitting 11 constituting the body 10 includes, in succession along the axis X-X: the tab 12, the tubular portion 13, and the arms 14. This fitting 11 is advantageously obtained essentially by stamping a precut metal sheet, the tab 11 and the arms 14 being made respectively by stamping together with the tubular portion 13. To make this metal sheet easier to stamp, the arms 14 are angularly offset by about 90° around the axis X-X from the branches 12B of the tab 12, which amounts to saying that the angle a formed between the planes I and II referenced in FIG. 3 is about 90°.

The orifice $12A_1$ is easily obtained by cutting or punching out from the wall 12A, in other words, by an operation that is inexpensive and easy to automate.

Figure 6:
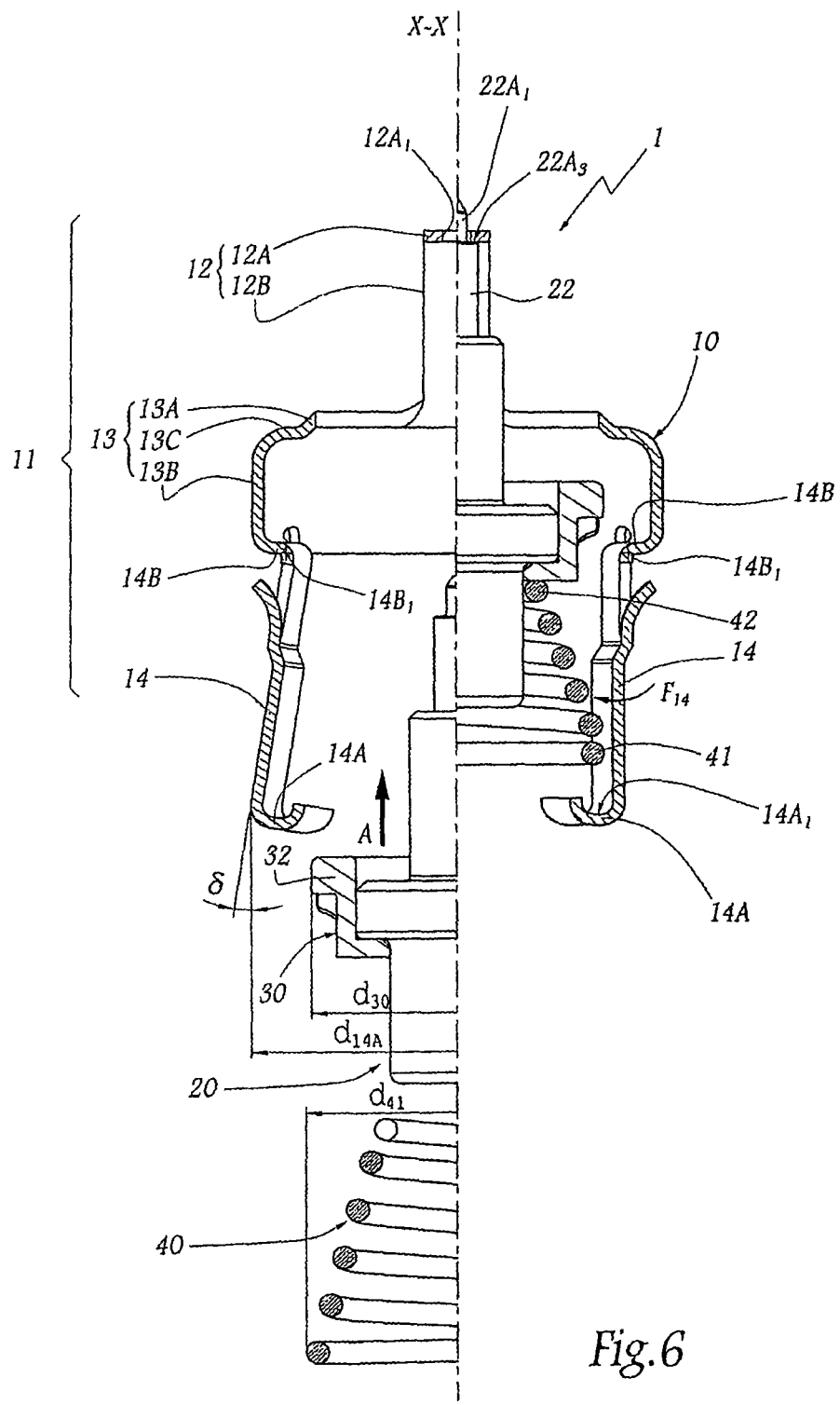
FIG. 6 is a section view analogous to FIG. 2 showing how the other components of the thermostat are assembled in the body of FIG. 3, the left and right halves of FIG. 6 being associated respectively with successive steps in performing such assembly.

The thermostat 1 is assembled by arranging, within the fitting 11, simultaneously the thermostatic element 20 with the cup 21 thereof previously being provided in stationary manner with the shutter member 30, and the compressed spring 40. To make assembly easier, the top end 14B of each arm 14 is advantageously deformable in the manner of a hinge so that each arm can be moved relative to the remainder of the fitting 11 by being tilted about an axis $14B_1$ that extends level with the end 14B in a direction that is substantially circumferential about the axis X-X, as shown in FIG. 6. More precisely, if the fitting 11 is considered at the end of its own fabrication by stamping, the arms 14 do not extend accurately parallel to the axis X-X, but are inclined relative to said axis, sloping downwards away from the axis, as shown in FIG. 3 and in the left-hand portion of FIG. 6. In longitudinal section as in FIG. 6, the angle δ formed between the longitudinal direction of each arm and the axis X-X is a few degrees, e.g. about 5°. In other words, the radial distance $d_{14A}$ in the left-hand portion of FIG. 6 between the end 14A of each arm and the axis X-X is greater than the radial distance between the end 14B and the axis.

In this position, each of the ends 14A is far enough away from the axis X-X not to impede axial insertion from below of the other components of the thermostat 1 into the body 10. In other words, the above-mentioned radial distance $d_{14A}$ is designed to be greater than the corresponding radial distances $d_{30}$ and $d_{41}$ of the shutter member 30 carried by the thermostatic element 20 and of the spring 40, as shown in the left-hand portion of FIG. 6.

The thermostatic element 20 is then inserted between the arms 14 and then into the inside of the tubular portion 13, as represented by arrow A, until the top end peg $22A_1$ of the piston 22 is received in the through orifice $12A_1$ in the wall 12A, thus enabling the element 20 to be centered inside the fitting 11 on the axis X-X. Inserting the thermostatic element as centered in this way continues until the shoulder $22A_3$ comes to bear axially against the bottom structure $12A_2$ of the wall 12A, as in the right-hand portion of FIG. 6. The peg $22A_1$ is then clearly visible from the top of the thermostat, inside the orifice $12A_1$, thus making it possible to verify visually that the element 20 has been put into place properly, even if only a top end portion of the body 10 can be observed freely.

Since the shutter member 30 has previously been fitted in stationary manner around the cup 21, inserting the thermostatic element 20 enables the shutter member 30 to be put into place inside the tubular portion 13, with the fingers 33 bearing slidably against the inside face $13B_1$ of the wall 13B. To prevent the top ends 14B of the arms 14 impeding the positioning of these fingers 33 inside the wall 13B, the angular positioning about the axis X-X between the shutter member 30 and the fitting 11 is advantageously designed so that each finger 33 is offset by about 45° relative to the arm 14 around the periphery of the wall 13B, which amounts to saying that the angle β formed between the lanes marked II and V in FIG. 3 is substantially to 45°.

After the thermostatic element 20 has been inserted in the fitting 11, the spring 40 is inserted axially upwards between the arms 14, i.e. following the same insertion direction A as the element 20. In a variant, the spring could be inserted simultaneously with the thermostatic element. Once the turn 42 bears against the shutter member 30, the upward insertion movement is continued so as to compress the spring against the shutter member until the turn 41 lies axially above the axial level of the bottom ends 14A of the arms 14, as shown in the right-hand portion of FIG. 6. In practice, the spring can be compressed by means of tooling that extends across the axis X-X between the arms 14 along the periphery of the fitting 11. While maintaining the spring in this compressed state, the arms 14 are then tilted inwards, i.e. towards the axis X-X about their respective axes $14B_1$, as represented by arrow $F_{14}$ in the right-hand portion of FIG. 6. Each of the ends 14A of the arms thus comes closer to the axis X-X until these ends lie axially under the turn 41. The arms then extend substantially parallel to the axis X-X, thus enabling the arms to withstand effectively the forces delivered by the spring and also the forces generated in operation by the thermostatic element. The tooling that is holding the spring 40 in the compressed state is then withdrawn, thus enabling the spring to relax partially, until its turn 41 comes to bear against the bottom faces $14A_1$ at the ends 14A of the arms 14. The turn 41 is held in the recesses defined by the hook shape at the ends 14A, thereby preventing these ends from moving apart were the ends 14B to tend to deform spontaneously so as to bring the arms 14 back into their initial sloping configuration as they were at the end of stamping. The thermostat is then in its assembled configuration of FIGS. 1 and 2 and is thus similar to a one-piece cartridge, ready for subsequently being implanted within a fluid circuit.

The thermostat 1 is particularly quick and easy to assemble, since both of the essential steps of such assembly, namely inserting the thermostatic element 20 and the spring 40 following the linear movement A, and tilting the arms about the axes $14B_1$ following the movement $F_{14}$, can be automated easily, particularly on an assembly line. Furthermore, no part, and in particular no stiffener part, needs to be fitted to the fitting 11 having the element 20 and the spring 40 engaged therein.

The thermostat 1 can subsequently be put into place in the connection region between the tube 2 and the hose 3. For this purpose, and as shown in the left-hand portions of FIGS. 1 and 2, the body 10 and the tube 2 are brought axially towards each other along arrow B so that the arms 14 are inserted in full into the inside of the tube 2. Advantageously, the diameter of the wall 13B is designed to be substantially equal to the end diameter of the tube 2, while the radial distance between the outside faces of the arms 14 is designed to be smaller than the inside diameter of said end of the tube 2, a small radial shoulder thus connecting each top end 14B of each of the arms with two small diametrically-opposite regions of the bottom end of the wall 13B. As a result, putting the thermostat 1 into place at the end of the tube 2 consists in inserting the arms 14 into said end of the tube until the bottom end face $13B_2$ of the wall 13B where it is free between the arms 14 comes to bear axially again the top end face 2A of the tube 2, as can be seen in the plane of FIG. 1.

In order to enable the thermostat 1 to be held at the end of the tube 2, in particular prior to the hose 3 being put into place, each arm 14 is provided in its main portion with a tongue 15 formed integrally with the remainder of the arm. By way of example, each tongue is obtained by appropriately cutting the wall constituting the arm 14 and then curving the tongue as cut out in this way about an axis $15B_1$ that is circumferential about the axis X-X. Each tongue 15 then has a bottom end 15B integral with the main portion of the arm 14 where the axis $15B_1$ extends, and a free top end 15A, with the body of the tongue interconnecting the ends 15A and 15B presenting in longitudinal section a profile that is curved with its concave side facing downwards. At rest, i.e. prior to the thermostat 1 being put into place in the end of the tube 2, the end 15A of each tongue extends beyond the outer envelope surface of the arm 14 away from the axis X-X.

When the body 10 and the tube 2 are moved towards each other along arrow B, the end face 2A of the tube comes to bear against the concave outside surface of each tongue and slides against said surface causing the tongues to tilt inwards, towards the axis X-X, about the respective axes $15B_1$, as represented by arrow $15B_2$ in the left-hand portion of FIG. 2. When the end face 2A subsequently comes to bear against the end face $13B_2$ of the wall 13B, each of the tongues 15 tilts elastically in the opposite direction to return towards its initial position, because of the presence of a hole 2B passing radially through the top end wall of the tube 2, as represented by arrow $15B_3$ in the right-hand portion of FIG. 2. In other words, each tongue 15 engages the associated orifice 2B in the tube 2, thereby preventing untimely separation of the thermostat 1 from the tube. It is still possible to separate the thermostat from the tube, by causing both tongues 15 to tilt simultaneously inwards, with this being done by using suitable tools having tips that can be inserted from the outside into each of the orifices 2B.

The hose 3 is subsequently fitted around the top end of the tube 2, as represented by arrow C in FIGS. 1 and 2. The bottom end of the hose covers the thermostat 1 and the top end of the tube 2 so as to extend axially over an outer peripheral bead 2C on the tube 2, as shown in the right-hand portion of FIGS. 1 and 2. The hose 3 is held more securely in place around the tube 2 by means of a peripheral collar 6 or the like.

Various arrangements and variants of the thermostat 1 and of its method of fabrication can also be envisaged, including the following examples:

- more than two support arms 14 may be formed integrally with the remainder of the fitting 11, in particular arms that are distributed uniformly around the axis X-X;
- the retaining tongues 15 may be incorporated within the body 10 in locations other than in a main portion of each arm 14, in particular depending on the shape of the tube 2 into the end of which the thermostat is to be placed;
- the outside shape of the body 10 is not restricted to that shown in the figures; in particular, the region of the body 10 that extends axially between the wall of the seat 13A and the bearing wall 12A of the thermostatic element 20 may include a tubular wall centered around the axis X-X so as to give this zone of the fitting 11 a tubular shape as presently exists with standard thermostats, in particular including a peripheral fold obtained by stamping together with the remainder of said additional tubular wall, where there is preferably fitted a sealing gasket for engaging the end of the hose or a similar tube fitted onto the thermostat;
- the presence of the shutter member 30 fitted around the cup 21 is not essential, if provision is made for the swollen portions 21A of the cup to act directly as a member for closing the shutter seat defined by the wall 13A; this applies for example when a small amount of liquid leakage through the "closed" thermostat can be tolerated, in which case contact between the metal cup 21 and the wall of the seat 13A need not be completely leaktight; and/or
- to avoid the arms 14 tending to return to their initial inclined configuration once they have been moved towards each other to support the compressed spring 40, a variant of the fabrication method consists in obtaining the fitting 11, at the end of the stamping operation, with its arms in a geometrical configuration that is substantially identical to their configuration in operation, i.e.

with the arms substantially parallel to the axis X-X; under such circumstances, prior to inserting the element 20 and the spring 40 into the inside of the fitting 11, it is necessary to splay the arms apart radially away from the axis X-X, by deforming their ends 14B so as to cause the arms to tilt outwards about the axes $14B_1$, until the radial distance $d_{14A}$ is greater than the radial dimensions $d_{30}$ and $d_{41}$ of the components of the thermostat that are to be inserted between the arms.

The invention claimed is:

1. A thermostat for regulating a flow of fluid, such as a flow of cooling fluid of an internal combustion engine, the thermostat comprising:
   a thermostatic element that includes a cup filled with a thermally expandable material and a piston movable relative to the cup along an axis (X-X) of the thermostatic element under an effect of the thermally expandable material during a variation in the temperature of the fluid flow being regulated;
   a compressed spring urging the cup and the piston towards each other; and
   a fluid flow body for passing the fluid flow to be regulated, the body having arranged therein the thermostatic element and the spring in such a manner that, in operation, the piston is held stationary relative to the body, a shutter member associated with the cup being connected in fixed manner to the cup and adapted to shut the fluid flow through the thermostat by coming into contact against an associated seat of the body, and a decompression force of the spring being absorbed by the body, the body including a metal fitting which includes in succession along the axis (X-X) of the thermostatic element:
      a bearing tab against which the piston bears in stationary manner and which bearing tab extends along a direction that is transverse relative to the axis (X-X) of the thermostatic element;
      a tubular portion that is centered on the axis (X-X) of the thermostatic element and that defines the seat of the body; and
      two spring support arms that extend from the tubular portion lengthwise generally along a direction of the axis (X-X) of the thermostatic element, each spring support arm having a first free end remote from the tubular portion, each first free end having a contact surface for engaging the spring against which the spring is compressed;
   wherein each spring support arm has a second end directed towards the tubular portion, each spring support arm is connected to the tubular portion in a deformable manner so as to be movable between an assembly position wherein the spring support arms are inclined outwardly toward the free ends thereof relative to the axis (X-X) so that the thermostatic element, shutter and the spring may be inserted between the spring support arms and into the body, and an operating position in which the free ends of the spring support arms are moved toward the axis (X-X) to a position closer to one another such that one end of the spring seats against the contact surfaces of the spring support arms.

2. The thermostat according to claim 1, wherein the two spring support arms are diametrically opposite relative to the axis (X-X) of the thermostatic element.

3. The thermostat according to claim 2, wherein the bearing tab includes two branches which are diametrically opposite one another relative to the axis (X-X) and the two spring support arms are angularly around the axis (X-X) of the thermostatic element by substantially 90° relative to the two branches forming portions of the bearing tab.

4. The thermostat according to claim 1, wherein a free end portion of the piston remote from the cup includes a projecting peg that has a cross section that is smaller than a cross section of the free end portion of the piston, and the bearing tab includes a bearing surface for the free end portion of the piston and a receiver orifice in the bearing surface for receiving the projecting peg there through.

5. The thermostat according to claim 4, wherein the receiver orifice and the free end of the piston have cross-sections that are of the same shape.

6. The thermostat according to claim 1, wherein the shutter member is mounted in stationary manner about the cup and includes a sealing surface adapted to come into leak tight contact against the seat of the body to close the fluid flow through the thermostat, and the shutter member also including guide means for sliding against an inside wall of the tubular portion that is distinct from the seat of the body.

7. The thermostat according to claim 6, wherein the guide means includes a plurality of spaced fingers distributed in substantially uniform manner around a periphery of the shutter member.

8. The thermostat according to claim 1, wherein the metal fitting further includes at least one deformable tongue adapted to engage elastically an inner wall of a tube when the thermostat is inserted into the tube.

9. The thermostat according to claim 8, wherein the at least one deformable tongue is integral with one of the spring support arms.

10. The thermostat according to claim 1, wherein each spring support arm is movable between its assembly and operating positions by tilting about an axis that is substantially perpendicular to and spaced from the axis (X-X) of the thermostatic element.

11. The thermostat according to claim 1 wherein, in the operating position, the spring support arms extend substantially parallel to the axis (X-X) of the thermostatic element.

12. The thermostat according to claim 1, wherein the first free end of each spring support arm has a hook shape with a recess to receive an end turn of the spring a bottom of the recess defining the contact surface.

13. The thermostat according to claim 1, wherein the metal fitting is formed as one piece.

14. A method of fabricating a fluid flow regulating thermostat including a thermostatic element that includes a CUP filled with a thermally expandable material and a piston movable relative to the CUP along an axis (X-X) of the thermostatic element under an effect of the thermally expandable material during a variation in the temperature of the fluid flow being regulated;
   a compressed spring urging the CUP and the piston towards each other; and
   a fluid flow body for passing the fluid flow to be regulated, the body having arranged therein the thermostatic element and the spring in such a manner that, in operation, the piston is held stationary relative to the body, a shutter member associated with the CUP being connected in fixed manner to the CUP and adapted to shut the fluid flow through the thermostat by coming into contact against an associated seat of the body, and a decompression force of the spring being absorbed by the body, the body including a one-piece metal fitting which includes in succession along the axis (X-X) of the thermostatic element:

a bearing tab against which the piston bears in stationary manner and which bearing tab extends along a direction that is transverse relative to the axis (X-X) of the thermostatic element;

a tubular portion that is centered on the axis (X-X) of the thermostatic element and that defines the seat of the body; and two spring support arms that extend from the tubular portion lengthwise generally in a direction of the axis (X-X) of the thermostatic element, each spring support arm having a first free end remote from the tubular portion, each first free end having a contact surface for engaging the spring and against which the spring is compressed;

wherein each spring support arm has a second end directed towards the tubular portion, each spring support arm is connected to the tubular portion in a deformable manner so as to be movable between an assembly position wherein the spring support arms are inclined outwardly toward the free ends thereof relative to the axis (X-X) so that the thermostatic element, shutter member and the spring may be inserted between the spring support arms and into the body, and an operating position in which the free ends of the spring support arms are moved toward the axis (X-X) to a position closer to one another such that one end of the spring seats against the contact surfaces of the spring support arms, the method comprising the steps of:

stamping the one-piece metal fitting from a metal sheet in such a manner that the bearing tab, the tubular portion, and the spring support arms are formed as a single piece;

securing the shutter about the thermostatic element;

inserting the thermostatic element, shutter member and the spring along the axis (X-X) of the thermostatic element into an inside of at least the tubular portion;

compressing the spring axially towards the tubular portion beyond an axial position of the first end of each spring support arm;

while keeping the spring compressed, moving the first end of each spring support arm towards the axis (X-X), by deforming the second end of the spring support arms, until the contact surfaces are disposed axially in alignment with the spring; and decompressing the spring until the spring presses axially against the contact surface of each spring support arm.

15. The method according to claim 14, wherein, while being stamped, the one-piece metal fitting is formed with the first end of each spring support arm at a radial distance from the axis (X-X) of the thermostatic element that is greater than corresponding radial dimensions of the thermostatic element, the shutter and the spring.

16. A thermostat for regulating a flow of fluid, such as a flow of cooling fluid of an internal combustion engine, the thermostat comprising:

a thermostatic element that includes a cup filled with a thermally expandable material and a piston movable relative to the cup along an axis (X-X) of the thermostatic element under an effect of the thermally expandable material during a variation in the temperature of the fluid flow being regulated;

a compressed spring urging the cup and the piston towards each other; and a fluid flow body for passing the fluid flow to be regulated, the body having arranged therein the thermostatic element and the spring in such a manner that, in operation, the piston is held stationary relative to the body, the cup having an outer portion adapted to function to shut the fluid flow through the thermostat by coming into contact against an associated seat of the body, and a decompression force of the spring being absorbed by the body, the body including a metal fitting which includes in succession along the axis (X-X) of the thermostatic element:

a bearing tab against which the piston bears in stationary manner and which bearing tab extends along a direction that is transverse relative to the axis (X-X) of the thermostatic element;

a tubular portion that is centered on the axis (X-X) of the thermostatic element and that defines the seat of the body; and two spring support arms that extend from the tubular portion lengthwise generally along a direction of the axis (X-X) of the thermostatic element, each spring support arm having a first free end remote from the tubular portion, each first free end having a contact surface for engaging the spring against which the spring is compressed;

wherein each spring support arm has a second end directed towards the tubular portion, each spring support arm is connected to the tubular portion in a deformable manner so as to be movable between an assembly position wherein the spring support arms are inclined outwardly toward the free ends thereof relative to the axis (X-X) so that the thermostatic element and the spring may be inserted between the spring support arms and into the body, and an operating position in which the free ends of the spring support arms are moved toward the axis (X-X) to a position closer to one another such that one end of the spring seats against the contact surfaces of the spring support arms.

* * * * *